United States Patent [19]

Moreno et al.

[11] Patent Number: 4,780,808
[45] Date of Patent: Oct. 25, 1988

[54] CONTROL OF CACHE BUFFER FOR MEMORY SUBSYSTEM

[75] Inventors: Robert J. Moreno, Boulder; Brian E. Trede; Robert W. Schmidt, both of Lafayette, all of Colo.

[73] Assignee: Storage Technology Corporation, Louisville, Colo.

[21] Appl. No.: 104,565

[22] Filed: Oct. 2, 1987

Related U.S. Application Data

[63] Continuation of Ser. No. 935,632, Nov. 25, 1986, abandoned, which is a continuation of Ser. No. 441,818, Nov. 15, 1982, abandoned, which is a continuation-in-part of Ser. No. 325,288, Nov. 27, 1981, abandoned.

[51] Int. Cl.$^4$ ............................................. G06F 13/00
[52] U.S. Cl. .................................................. 364/200
[58] Field of Search ... 364/200 MS File, 900 MS File; 360/63

[56] References Cited

U.S. PATENT DOCUMENTS

| Re. 31,069 | 10/1982 | Chang et al. | 360/63 |
|---|---|---|---|
| 3,566,358 | 2/1971 | Hasbrouck | 364/200 |
| 3,629,860 | 12/1971 | Capozzi | 364/200 |
| 3,938,097 | 2/1976 | Niguetle, III | 364/200 |
| 4,007,448 | 2/1977 | Sergeant et al. | 364/200 |
| 4,075,686 | 2/1978 | Calle et al. | 364/200 |
| 4,198,699 | 4/1980 | Caddell | 365/230 |
| 4,204,250 | 5/1980 | Getson, Jr. et al. | 364/200 |
| 4,241,420 | 12/1980 | Fish et al. | 364/900 |
| 4,310,883 | 1/1982 | Clifton et al. | 364/200 |
| 4,394,733 | 7/1983 | Swenson | 364/200 |
| 4,476,526 | 10/1984 | Dodd | 364/200 |
| 4,509,118 | 4/1985 | Shenk | 364/200 |
| 4,583,166 | 4/1986 | Hartung et al. | 364/200 |

OTHER PUBLICATIONS

IBM Manual, "Type 7612 Disk Synchronizer for Type 7303 Disk File", pp. 14, 15, circa 1960.
IBM Tech. Discl. Bulletin, Jun. 1970, pp. 93-95.
IBM Tech. Newsletter, GN 26-0351, Nov. 15, 1979, pp. 79, 80.
Brochure titled "Improve System Performance with the STC 4305 Solid State Disk, Author—Storage Technology Corporation—Date—Jun., 1981.

*Primary Examiner*—Eddie P. Chan
*Attorney, Agent, or Firm*—Woodcock Washburn Kurtz Mackiewicz & Norris

[57] ABSTRACT

A solid-state cache memory subsystem configured to be used in conjunction with disk drives for prestaging of data in advance of its being called for by a host computer features a controller featuring means for establishing and maintaining precise correspondence between storage locations in the solid-state array and on the disk memory, for use in establishing a reoriented position on a disk in the event of error detection, and in order to determine when a predetermined quantity of data has been read from the disk into the cache in a staging operation.

2 Claims, 5 Drawing Sheets

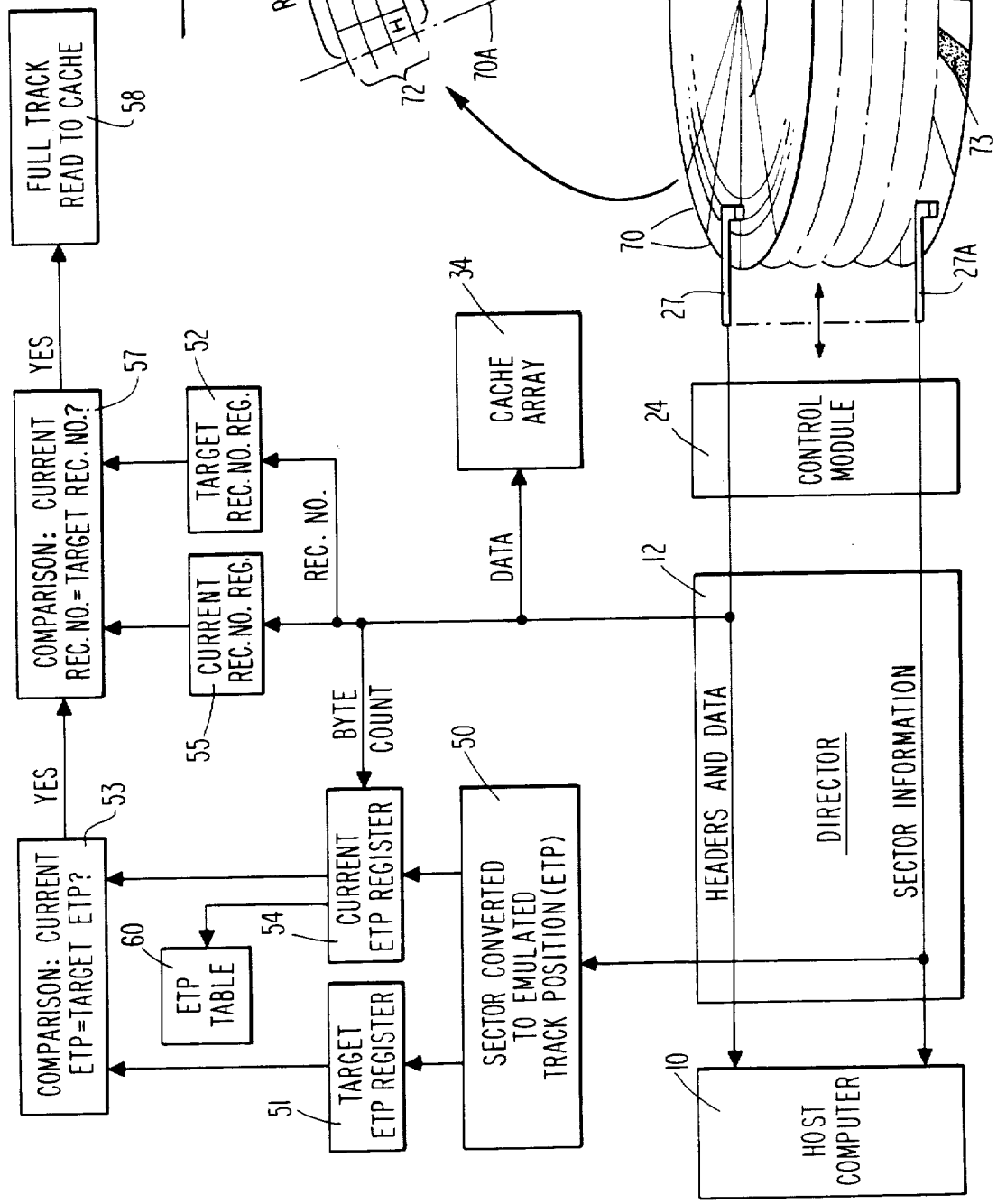

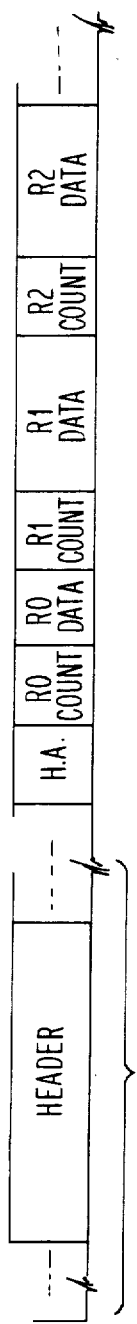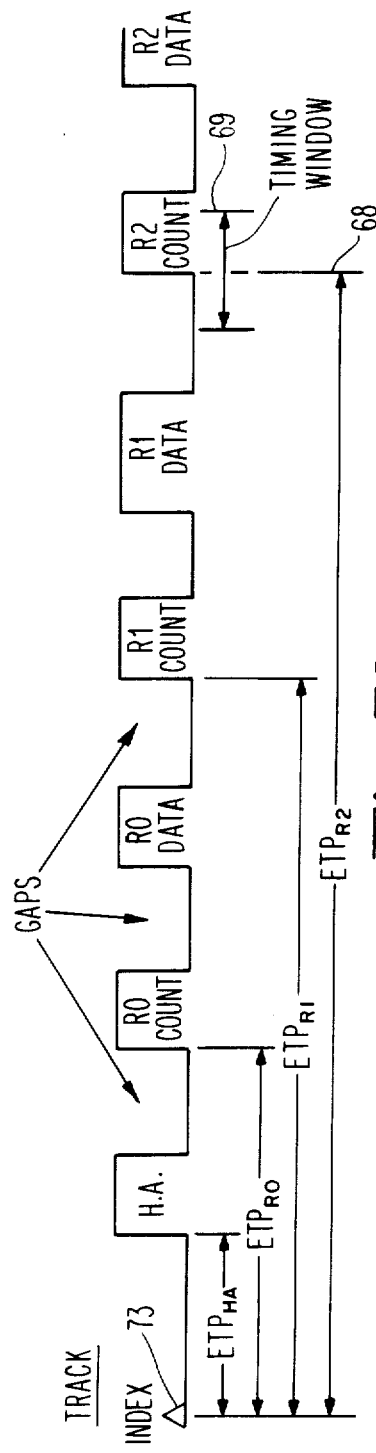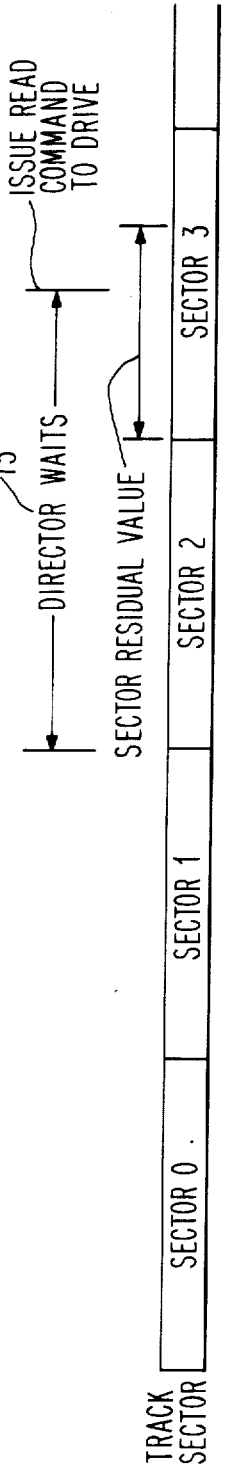

CONTROL OF CACHE BUFFER FOR MEMORY SUBSYSTEM

CROSS REFERENCE TO RELATED APPLICATION

This is a continuation of application Ser. No. 935,632, filed Nov. 25, 1986, now abandoned, which is a continuation of application Ser. No. 441,818, filed Nov. 15, 1982, now abandoned, which in turn was a continuation-in-part of application Ser. No. 325,288, filed Nov. 27, 1981, now abandoned.

FIELD OF THE INVENTION

This invention relates to improvements in cache memory subsystems used in data processing systems to improve the overall throughput or utility of the data processing system. In particular, the invention relates to organization of the cache buffer memory as to header and data formatting, and to control of the correspondence between the cache buffered data and its home position on magnetic storage media.

BACKGROUND AND OBJECTS OF THE INVENTION

Improvements in data processing systems have generally been directed at reduction either of the average time required to execute a given instruction or reduction in cost of the equipment required to perform such an instruction. One design tradeoff which has typically been made is that of cost versus speed for units of memory for the storage of data. For example, tape memory is traditionally slower and less expensive than disk memory. Disk memory in turn is available in several types; the selection of any one type involves a cost/speed tradeoff. Disk memory is slower but less expensive than solid-state memory which itself is available in several types, the selection of which again involves a cost/speed tradeoff. Thus, it continues to be a need of the art to provide cheaper, faster memories or, failing that, to improve the efficiency of presently existing memory types. The present invention relates to an improvement of the second type. In particular, the invention involves apparatus and methods of operation thereof for reducing the average time necessary for a host central processing unit (CPU), which typically comprises an arithmetic and logic unit and a main memory unit for retention of the instructions and data currently being operated on, to obtain data stored on a less expensive, long-term data storage device, such as a magnetic disk or tape drive unit.

Delays in memory access occur due to mechanical limitations on the apparatus. For example, in the case of a disk drive, in general, plural disks rotate at a fixed speed past read/write heads which may either be stationary with respect to the disk or move radially back and forth with respect to the disk in order to juxtapose the heads to various portions of the disk surfaces. In either case, there is a finite average time required for a particular data record to be located and read from the disk into a faster form of memory, typically a solid-state main memory included in the host computer. The delay may involve the "seek" time required for the head to be moved radially to the particular "track" selected, as well as "latency" time required for the disk to rotate with respect to the head until the beginning of the particular record sought is juxtaposed to the head for reading and writing.

Accordingly, it is an object of the invention of copending application Ser. No. 325,346 filed Nov. 27, 1981, of Dodd entitled "Cache Buffered Memory Subsystem", incorporated herein by reference and now U.S. Pat. No. 4,476,526 to provide a memory subsystem in which the average time required for a record sought to be transferred to the main memory system of a host computer is significantly reduced. The present invention relates to details of a preferred embodiment of that invention.

Prior art data processing systems typically comprise a host computer and long-term memory storage means including such devices as magnetic disk memory units and magnetic tape units. Communication from the host computer to the disk or tape memory subsystem is generally made via a "channel" which physically comprises a defined set of signal connections over which all information—including data as well as commands, control signals, status signals, request signals and the like—must pass. In order that a memory subsystem can be marketable, it must "interface" or mate directly with a channel identical with those with which prior memory subsystems mated, thus being "plug compatible" with the host computer.

It is an object of the present invention to provide an improved memory subsystem which is "plug-compatible" with a prior art host computer.

Similarly, it is desirable if not commercially requisite that any data subsystem not require modification to the host computer's programming instructions or "software" upon connection, i.e., that it be "software-transparent" to the host.

It is an object of the present invention to provide a memory system which provides improved performance as noted above, while being software-transparent to the host.

The copending application referred to above and incorporated by reference herein refers to a cache buffer memory supsystem comprising a solid-state cache memory and a cache memory controller. The solid-state cache memory contains data written thereinto in advance of a host's request for that data. Thereafter, when the host calls for that data it ca be supplied to the host immediately inasmuch as there is no seek or latency time required to access any portion of a solid-state memory array. In a preferred embodiment of that invention, described more fully in copending application Ser. No. 325,350 filed Nov. 27, 1981, of Dodd et al, entitled "Detection of Sequential Data Stream", and now U.S. Pat. No. 4,468,730, and a continuation-in-part of that application Ser. No. 441,901 filed Nov. 15, 1982, now U.S. Pat. No. 4,536,836, both incorporated herein by reference, the cache memory controller determines at what points it would be desirable to "stage" data not having been called for by the host into the cache memory array in anticipation of its being called for.

Those skilled in the art will recognize that disk memories of the type in most comxon use at the present time generally comprise a plurality of disks each having upper and lower surfaces for the storage of data by magnetization of areas on their surfaces. The disks are divided into concentric tracks which are divided into sectors. An index mark is provided on each disk identifying a first sector. When the host computer desires data from a disk drive it issues a "SET SECTOR" command whereby the disk drive is notified that data beginning with the sector identified by the host is to be read. According to a preferred embodiment of the present invention the data called for in each reading operation initiated by the host is examined to consider whether it is likely to be a part of a sequence of such records to be called for. If so, it is considered that the following record is likely to be called for, and the entire track from which the access request was satisfied is cached. If the remainder of the track is then called for by the host, it is available in cache memory and the host's request can be very quickly satisfied. Moreover, if the entire track is thereafter called for, the succeeding track is then "prestaged" to the cache in anticipation of further requests.

Those skilled in the art will recognize that numerous types of disk drives are available, each having differing amount of data stored per track. Accordingly, if the cache memory subsystem is to store data by tracks efficiently, it must be adapted to contain varying lengths of data efficiently. This is satisfied in accordance with copending application Ser. No. 325,351 filed Nov. 27, 1981, of Coulson et al, entitled "Adaptive Domain Partitioning of Cache Memory Space", and now U.S. Pat. No. 4,430,712, and a continuation-in-part of that application, Ser. No. 411,791 filed Nov. 15,1982, having the same title.

While, as noted above, it is deemed desirable to bring data into the cache from a disk memory system track by track, it is not necessarily the case that each request will begin at the index mark which may be taken to the start of each track. Instead, if the host has called for the first record in the track, the subsequent record will inevitably start other than at the beginning of the track. Clearly, it would be desirable to read succeeding records into the cache without waiting for the disk drive to complete the particular rotation during which the first data record was read. In order to do so, it is clearly essential that accurate orientation of the relative location of the track on disk and its storage location in the cache be maintained so that, for example, host requests for data stored on the remainder of the track can be satisfied by access to the corresponding data storage addresses in the cache.

It is an object of the present invention to provide such accurate orientation of disk memory with cache memory.

Those skilled in the art will recognize that records when stored on disk drives have "headers" or count fields preceding each record which include information identifying the particular record, specifying its length and the like. As is understood in the art, the requirements of headers for data stored in solid-state memories are substantially different from those of count fields on magnetic disk media, such as disk drives, and it would be accordingly desirable to provide means for transforming a number of magnetic media count fields into a single solid-state memory header.

It is an object of the invention to perform this transformation of the count fields into a single header and, in particular, to provide a header of a length variable in accordance with the number of records on each track and not of fixed length as is usual in the magnetic media prior art.

As noted above, it is desirable that an entire disk track be read from disk memory into cache memory at one time, but not necessarily starting from the beginning or index mark of the track. Accordingly, it is an object of the present invention to provide a means whereby it can be reliably determined that an entire track of data has been read from a disk drive into the cache memory array.

Occasionally, it is necessary to convert a channel program that was operating on a track image in cache memory (a frame) to operating on the actual track on the disk; that is, it becomes necessary to read a portion of a track from the disk, rather than the cache, or to write to a track which has been cached. In each case, it is necessary to recreate the specific record and field orientation that existed in cache before continuing the channel program with records from the disk track.

The need for returning a channel program to disk arises in the following situations: (1) an error prevents data from being accessed in cache memory; (2) a write command is received in the channel program and it is deemed undesirable to write to cache memory; or (3) a sequential track required during multi-track processing is not located in cache memory.

It is an object of the present invention to perform an accurate reorientation from the records stored in cache memory to the same records stored on the disk track. Further, it is an object of this invention to perform this reorientation operation within a single revolution of the disk, without necessarily waiting for the index mark on the disk track to provide reorientation.

In the prior art, this was not always possible. Examples of related prior art systems include the Storage Technology Corporation 4000/4305 "solid-state disk" system, in which a solid-state memory effectively minimized a magnetic disk system and the Storage Technology Corporation 8880/8650 disk subsystem.

The 4000/4305 solid-state disk subsystem used a track remaining count which is similar to the emulated track position (ETP) of this invention. However, this track remaining count was not used for transferring orientation from a frame to a disk track; no magnetic disk memory was included in that system.

The 8880/8650 disk subsystem uses a reorient counter that counts an approximate full track revolution starting from the beginning of a record. If the 8880 director encounters errors reading a record, then the reorient counter in the device informs the director when the same record is about to pass under the read/write head again. This technique allows positive reorientation on a specific record on disk, but requires that orientation had been previously established on the disk.

SUMMARY OF THE INVENTION

The above mentioned needs of the art and objects of the invention are satisfied by the present invention in which reliable orientation of the cache memory with respect to the disk drive is maintained by generating a table of "emulated track position" (ETP) values equal to the approximate addresses on disk of the records being stored in the cache. The first ETP is the starting address which corresponds to the beginning address of the first record stored in the cache. The first ETP is thus a measure of the number of bytes from the index mark on the disk at which the starting point of the cached data was located. This value is saved as a "target" ETP, and is used to determine when a full track of data has been read. The next record's count field information is read and saved in a second register. The records on the track between the current orientation point and the index point can then be read. When the disk's index mark is reached, a current ETP value is initialized to zero in a third register. The data records are read from the index into the cache. As each field is read, the current ETP value is updated to count the number of bytes that have passed. After each incrementation the current ETP is compared to the target ETP. When it is greater than or equal thereto, the count field information from the last record read is compared against that stored in the storage director. If they are not equal, record reading continues. If they are, an indication is provided that the entire track has been read.

In accordance with the present invention, the ETP values can be used to reliably retransfer orientation of data being read from the cache back to the disk drive in the event of an error occurring in the middle of a read operation, or in the event of other conditions previously discussed which require returning the channel program to disk. In carrying out the invention, the ETP value for the record preceding the record upon which reorientation is to be obtained, i.e., the first record called for by the channel, is selected from the table of ETP values. The selected ETP value is converted into an equivalent sector number and a residual value by dividing the emulated track position by the number of bytes per sector, which is fixed. This produces an equivalent sector value which is supplied to the disk drive control module, where it is compared to the sector signal produced by the disk drive representing the sector currently rotating under the heads. When the desired sector is juxtaposed under the heads, the control module produces an interrupt signal which results in the director enabling the reading of records from disk after a further delay. The length of this further delay is controlled by the residual value, to align the beginning of reading with the correct record in the sector previously identified. The director enables the reading of address marks during a time period or "window" at the termination of the delay. In this manner, accurate detection of the desired record count field is obtained. Reliable and accurate reorientation is thus performed.

The foregoing and other objects, features and advantages of the invention will be better understood from the following more detailed description and appended claims.

BRIEF DESCRIPTION OF THE DRAWINGS

The invention will be better understood if reference is made to the accompanying drawings, in which:

FIGS. 4A and 4B depict the cache manager operations during a stage to cache and during reorientations;

FIG. 6 depicts the header, home address, count and data fields of a disk track which has been stored in cache memory; and FIGS. 7A-7C are timing diagrams respectively showing the home address, count and data fields as read from a disk track, the track sector signal, and the sector value signal.

DESCRIPTION OF THE PREFERRED EMBODIMENTS

As discussed above, the cache buffer memory subsystem of the present invention is designed to operate in accordance with a prior art host computer in such a manner that no modification of the host's hardware or software is required. In particular, the cache buffer memory subsystem of the invention should attach to the host computer through a conventional memory channel without modification; that is, it should be plug-compatible with, and software-transparent to, the host. In a preferred embodiment, the cache memory subsystem of the invention is designed to operate in accordance with an IBM Corporation computer (or other computer plug-compatible with the IBM unit) of the class in which the channel is defined by IBM Publication GA22-6974-4 entitled, "I/O Interface Channel to Control Unit". This volume describes the channel specifications for plug-compatible memory systems. In a particularly preferred embodiment, the cache buffered memory subsystem of the invention is comprised in a disk drive memory system of the type previously sold by the assignee of the present invention, reconfigured to include a solid-state random access memory (RAM) which can physically be included within the enclosure containing the disk drive storage director unit. Indeed, the addition of the cache feature may be made in such a manner as to be field-installable on previously shipped customer units at minimal additional complexity and cost, while substantial performance improvements may be realized.

Figure 1:
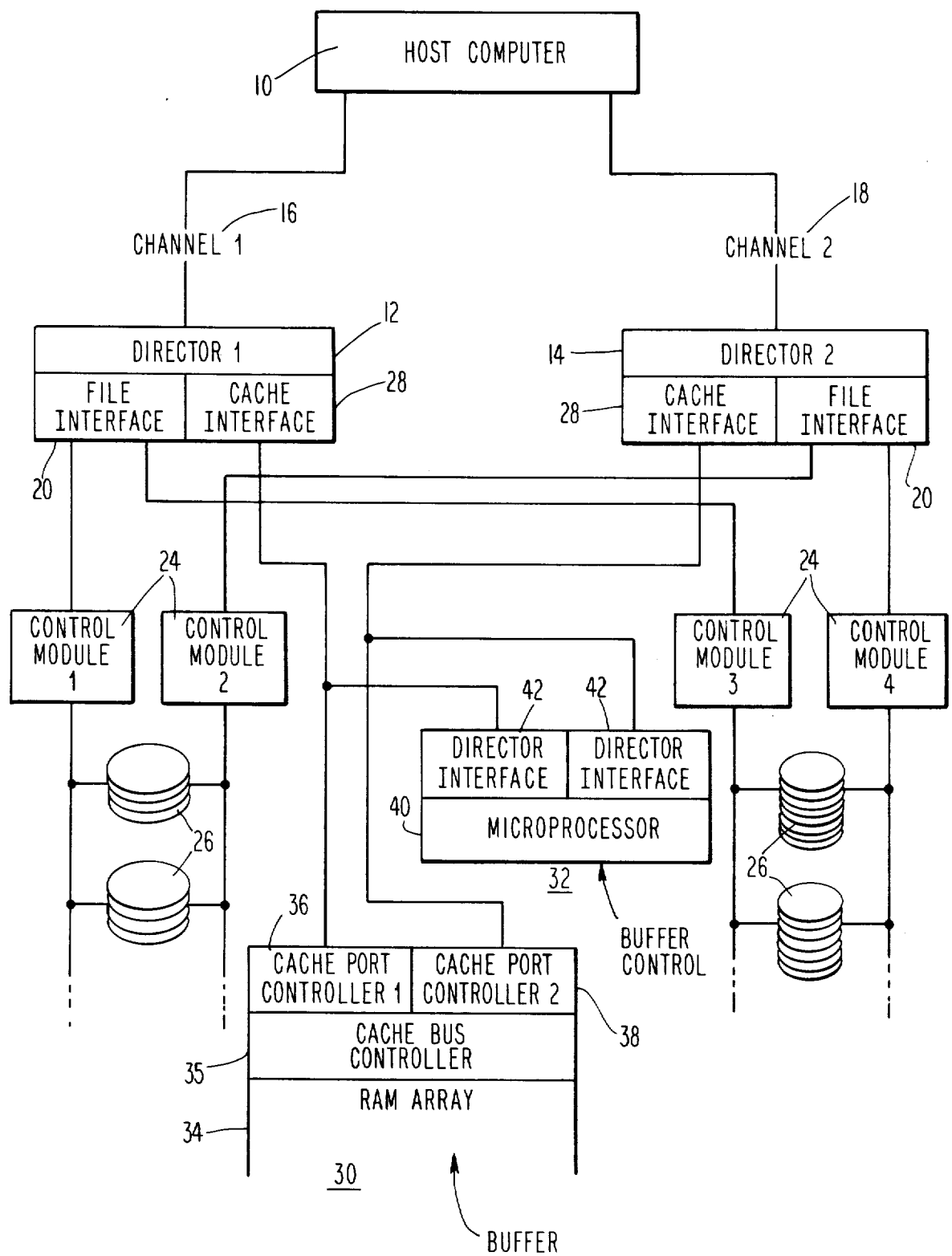
FIG. 1 shows a schematic overview of the system of the invention.

Referring now to FIG. 1, an overall view of a data processing system comprising a host computer system as defined above and a cache buffered memory subsystem is shown. The host computer 10 is connected to a pair of storage directors 12 and 14 through channels 16 and 18, respectively. The directors and channels can be multiplied further, as well known in the art. Each director comprises a file interface 20 through which data is passed, via control modules indicated generally at 24, and thence to disk drive units indicated generally at 26. As indicated schematically in the drawing, the disk drives 26 may be of various types. The control modules 24 to which the disk drives 26 are connected serve to interface varying types of disk drives with directors 12 and 14 such that plural types of disk drives 26 together with appropriate control modules 24 can be used in conjunction with identical directors. As described thus far, the system of FIG. 1 is conventional. According to the present invention, the directors 12 and 14 are modified to additionally comprise cache interface units 28 which serve to interface the directors 12 and 14 with a cache buffer memory subsystem according to the invention, which as schematically shown comprises a buffer unit 30 and a buffer control unit or manager 32. The buffer unit 30 has as its chief function the storage of data having been "staged" in anticipation of being required by the host computer. When the staged data is called for it can be very quickly read under control of a cache bus controller 35 out of a solid-state random access memory (RAM) array 34, the heart of the buffer unit, through one of a plurality of cache port controllers 36 and 38, respectively communicating with the directors 12 and 14, and thence to the host. This is generally a considerably faster process than reading the data directly from a disk drive unit 26 as there is no latency time involved in the use of the random access memory 34, as there is in the case of the disk memories 26.

Figure 2:
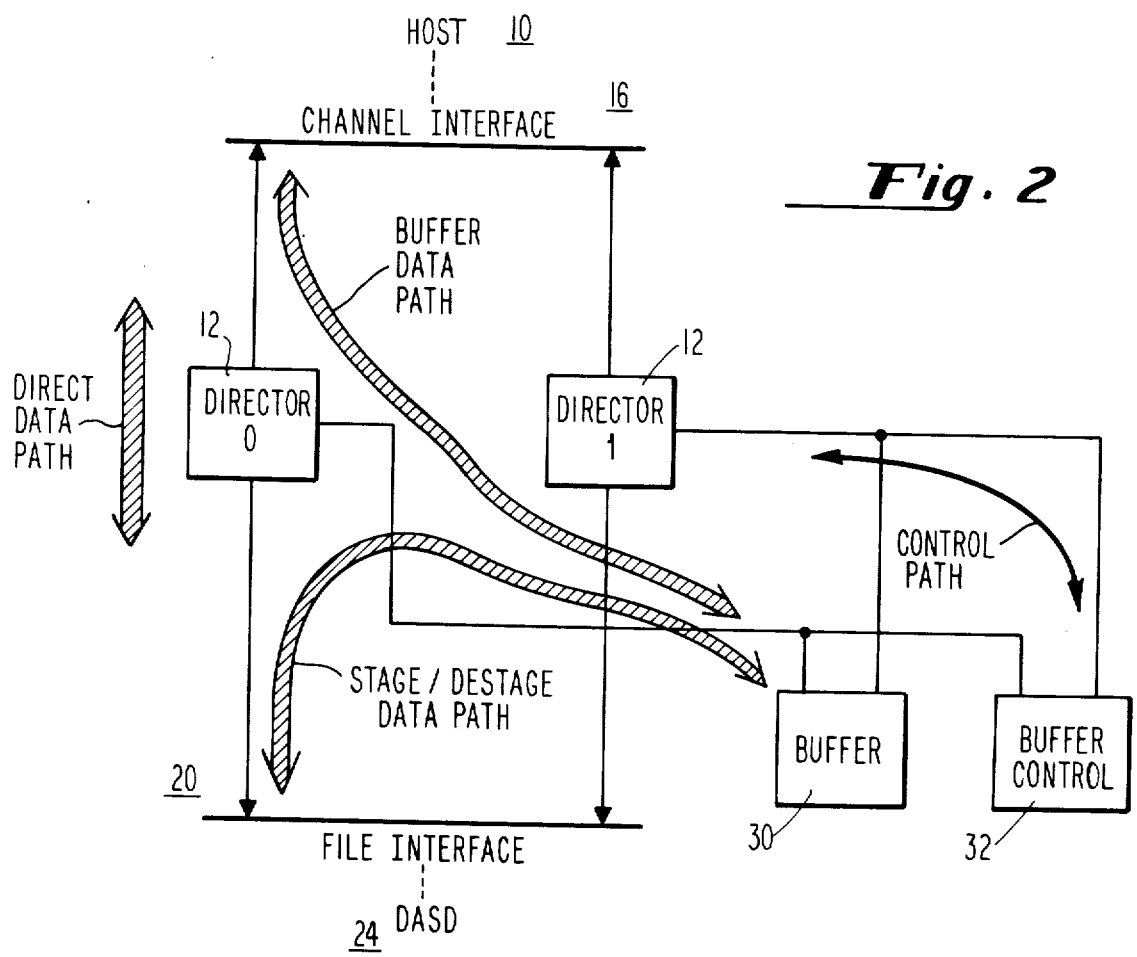
FIG. 2 shows the data and control paths in a simplified view of the system of the invention.

Referring now to FIG. 2 a schematic view is shown of the data flow between the file interface 20 and the host interface 16 in the cache buffered memory subsystem. The typical prior art data path directly from the channel interface 16 through a director 12 and via a file interface 20 to a disk drive, sometimes termed "DASD" for "direct access storage device" 24 is shown. This data path is preserved and is used, as will be discussed below, for all ordinary read operations, when there is an error in the cache buffer, and during ordinary write operations. In a staged read operation, however, data is read from DASD 24, passes from the file interface 20 through the director 12 and thence to the cache buffer 30, under the control of the buffer manager unit 32. When the host 10 then calls for the data actually to be supplied to it, the data passes out of the buffer 30 through the director 12 and through the channel interface 16 to the host 10. It will be appreciated that parallel connection is provided between the two directors 12, the channels 16, the buffer 30 and the file interface 20. That is to say, data may pass from a first director 12 from the buffer 30 enroute to the channel interface 16 after having been passed from DASD 24 to buffer 30 for staging by a second director 12. Such "paralleling" of directors 12 also permits data to move from the cache 30 to the host 10 even if the director 12 used to stage data into the cache buffer 30 then takes up another task before the data is actually called for by the host 10.

In this connection, it will be appreciated that the present IBM channel design provides a sequence of commands e.g., before an actual readout operation takes place. Typically, the host will issue a "START I/O" command to the channel. The channel in processing the "channel program" will issue a "SEEK" command to the director which will then cause the disk drive's head moving apparatus to access the proper track of the disk. When this has been done a signal is passed back to the channel indicating that the head is in position. After receipt of the "READ" command, the disk drive examines the count and key data fields for that containing the record of interest; when it is juxtaposed to the read/write head, the record is read via the director to the host's main memory for processing. According to the present invention, the same practice is followed upon receiving of a first read command. However, the channel program is also examined by the cache manager 32 for indications that the successive record is likely also to be called for by the host. If so, the buffer manager 32 then causes the director to have the succeeding record or records stored on the disk copied into into the cache buffer 30 so that subsequent read commands for successive records can more quickly be complied with. As noted above, the determination of which records appear to be members of a sequence of records to be called for by the host is the subject of copending application Ser. No. 325,350 filed Nov. 27, 1981, of Dodd et al entitled, "Detection of Sequential Data Streams", and now U.S. Pat. No. 4,468,730, and a continuation-in-part of that application, Ser. No, 441,901 filed Nov. 15, 1982, now U.S. Pat. No. 4,536,836 having the same title. In a particularly preferred embodiment, data is staged from the disk into the buffer an entire track at a time. Such disk tracks typically may comprise up to on the order of 100 records, i.e., blocks of data separated from one another by gaps and identified by headers comprising index marks and the like. The 100 records may in turn be part of a disk file which may occupy many tracks, or in the case of large data files, up to several complete disk units.

As noted above, it is desirable that the cache buffered memory subsystem be a field installable modification to a preexisting product thus adding minor additional cost and complexity to a memory subsystem while permitting substantial performance advantages.

Figure 3:
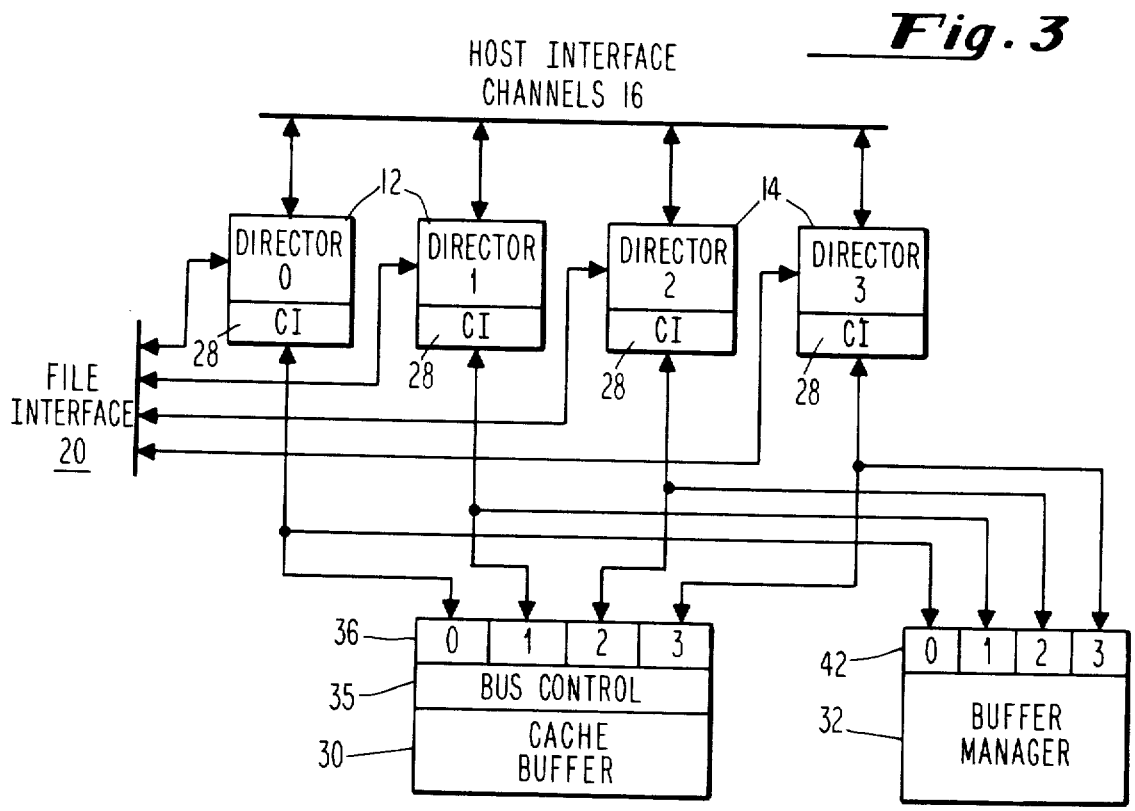
FIG. 3 shows an expanded view of connections between the directors, the file interface unit, and the cache buffer and manager units.

FIG. 3 shows one way in which the cache buffer feature of the invention can be added to a preexisting product while satisfying these conditions. FIG. 3 shows four directors 12 and 14 each connected to a host computer via a channel 16. As in the prior art the directors 12 and 14 are each connected by way of the file interfaces 20 to the control modules (not shown) which, for example, convert the director commands to forms suitable for accessing a particular type of disk and so forth. Thus, the control modules are selected in accordance with the type of disk storage media to which they are to be connected, while the directors 12 and 14 are the same regardless of the type of disks used. Such directors and control modules may be as presently found in commercial products of the assignee, for example, in the Storage Technology Corporation Model 8880 disk controller and Model 8650 disk drive units respectively. According to the present invention, to each director 12,14 is added a cache interface unit 28 which is connected to a buffer interface 36 connected to the bus controller 35 of the cache buffer unit 30. Control lines are also connected to the cache interface lines which run to the control interfaces 42 of the buffer manager 32. Thus, to the preexisting Model 8880 unit one need only add cache interface cards to the directors, and install the cache buffer and buffer manager units. Such an installation can be made to preexisting units in the field within a reasonable period of time and at reasonably modest additional cost.

It will be appreciated from inspection of FIG. 3 that the cache buffer 30 is connected in parallel to each of the directors 12,14 as is the buffer manager 32 which controls flow of data between the directors and the cache buffer. This is in distinction to, for example, a cache arrangement proposed by Memorex Corporation in which a single cache per each director is interposed between the control module and the director. This arrangement has several disadvantages; one of the prime disadvantages is that more caches are required. While for a given performance level such single director caches can be made somewhat smaller, they are then less likely to be fully utilized. Moreover, provision of a separate cache for each director does not allow two or more directors simultaneous access to the cache which is desirable. This alternate path access is very desirable in a highly active system to avoid path busy conditions. Such versatility is made possible by the arrangement of the invention as illustrated in FIG. 3.

As discussed above, in a preferred embodiment of the invention, it is configured as an add-on subsystem to a previously existing product, namely the Model 8880 disk controller manufactured by the assignee of the present invention, Storage Technology Corporation. In this embodiment, the director 12 performs the functions of the director in the Model 8880; that is, it directs and interfaces to the control modules (which, for example, demultiplex the data to serial form, for writing it to a disk) thus directly interfacing the drives themselves to the host channels by converting the data from the form in which it is stored on disk to one to which the channel can respond. The director 12 according to the invention performs the additional functions of buffered data transfer, and execution of the stage operation, i.e., writing of data from the disk 26, (FIG. 1) via the control module 24 into the cache buffer 30. The director 12 also provides buffer error recovery systems, which amount to bypassing of the buffer in favor of direct transfer of data from the disk 26 to channel interface 16, and the director communicates with the buffer manager 32. This is to say, the director 12 performs switching functions, controlling the flow of data between the file interface 20, to which the disk units 26 are connected, the cache buffer 30 and the channel interface 16 to which is connected the host computer. These switching functions are controlled in accordance with instructions received from the buffer manager 32. Thus, in the preferred embodiment in which the memory subsystem of the invention is added onto a preexisting STC 8880 product, the buffer manager 32, the cache buffer 30 and suitable control and data lines are added, so that the director 12 controls the data path in accordance with the instructions of the buffer manager 32.

As noted above, the buffer manager 32 determines whether a particular data record or series of records is likely to be called for by the host and accordingly decides whether or not to "stage" it into the buffer 30 in advance of its actually being called for by the host in order to save access time. The specific decision-making process performed by the buffer manager 32 in making this determination is the subject of copending appliation Ser. No. 325,350 filed Nov. 27, 1981 of Dodd et al entitled, "Detection of Sequential Data Stream", and now U.S. Pat. No. 4,468,730, and of a continuation-in-part of that application Ser. No. 441,901 filed Nov. 15, 1982, now U.S. Pat. No. 4,536,836. Broadly, the decision involves examining the channel program data to look for track jump orders, end-of-file indicators, write indicators and the like, events unlike to be encountered during reading of sequential data sets.

The cache buffer 30, which performs the function of storing the data, is preferably organized by frames. In a preferred embodiment, the cache is subdivided into "domains" of a fixed size chosen such that the individual frames which correspond to logical tracks on disk fit as closely to integrally as possible within the domains. This cache space organization scheme is the subject of copending application Ser. No. 325,351 filed Nov. 27, 1981, of Coulson et al, entitled "Adaptive Domain Partitioning of Cache Memory Space", and now U.S. Pat. No. 4,430,712 and a continuation-in-part of that application, Ser. No. 411,791 filed Nov. 15, 1982, now U.S. Pat. No. 4,440,024 both incorporated herein by reference. The cache buffer 30 also stores the control information or header which defines each individual variable length logical frame by count, key and data fields as noted above.

The buffer manager 32 in the preferred embodiment comprises a microprocessor 40 (FIG. 1) and performs the management function as follows. The chief function of the buffer manager 32 is to manage the space of the cache, that is, to direct the storage of data within the cache memory 30 and to retain the locations at which the specific tracks are stored in a "frame directory." The buffer manager 32 similarly schedules stage operations and communicates its instructions to the director 12. The buffer manager 32 also performs error management and recovery functions, which include switching the flow of data directly from the disk to the channel interface in the case of a catastrophic error.

The present invention is an improvement on the cache memory subsystem described above. After a first record has been determined to be part of a sequence of records, the remainder of the disk track is then desirably cached. This presents problems in address control and in correlation of the cached data with the data received or written on disk. In particular, inasmuch as the host's subsequent commands will be in terms of disk sector addresses and record numbers, not cache storage locations, accurate and fool-proof means must be provided to insure that the proper correlation is maintained. Moreover, it is also necessary to provide means for determining when a full track has been staged into the cache so that the staging operation can be terminated at precisely the correct time. The present invention solves these problems.

It would be a simple matter, of course, to begin staging at the index mark which is recorded at one location on each disk track and continue until the index mark was once again encountered. However, ordinarily the first record on the track will be that which is first accessed by the host, and hence most of the track will not have been read to the host at the time the determination to stage the remainder of the track is made. Therefore, the time taken for the disk to rotate the remainder of a revolution would be consumed while waiting for the index mark once again to be juxtaposed to the read/write head. This waste of time is clearly undesirable.

Additional constraints are posed by the requirement that varying sizes of disk tracks be supported by the cache memory according to the invention. This prevents the cache memory from being divided into subportions or "frames" of sizes equal to a particular disk track size and then simply assigning the starting addresses of each of the frames to the contents of the disk track as they are staged. In the preferred embodiment, the cache memory subsystem of the invention is instead divided into domains which are sized to contain substantially integral numbers of frames of varying sizes to accommodate varying disk track sizes. The domains themselves can be reallocated to other types of frames when desired. This is the subject of the copending Ser. No. 325,351 filed Nov. 27, 1981, of Coulson et al, entitled "Adaptive Domain Partitioning of Cache Memory Space" now U.S. Pat. No. 4,430,712, and a continuation-in-part of that application, Ser. No. 411,791, filed Nov. 15, 1982, now U.S. Pat. No. 4,440,024, both referred to above.

FIG. 4A will be referred to here to explain the way in which correspondence between the place on the disk at which a track of data to be stored in the cache is located and its address in the cache is maintained. A disk pack 26 is shown in FIG. 4A. The disk pack may comprise a plurality of data storage disks 26B which are accessed by read/write heads 27 and a dedicated disk 26A which contains permanently encoded servo and sector identification information. This information is read by a dedicated head 27A. As can be seen from FIG. 4A and the enlarged portion thereof shown above, each data surface 26B is divided into a plurality of sectors 77. Circumferentially extending tracks 72 extend across the sector boundaries 77A. As is usual, each track may be divided into one or more records indicated as R1, R2, etc., which each in turn comprise a "header", i.e., count field, indicated at H and data indicated by D. As shown, the record boundaries do not necessarily coincide with the sector boundaries 77A. The count field information contains, for example, control information such as the length of the following data record, syndhronization and address marks and is used to identify the specific record within the sector. Accordingly, in order to locate a particular record on disk, one must know the disk surface, the track number, the sector number, and the record number, the last of which is to be found within the count field. The first sector on the disk is located by an index mark 73 permanently written to the servo disk 26A from which sector numbers may be counted.

It will be apparent to those skilled in the art that if it is desired to cache a track of data from a disk to a cache memory, and if a portion of that track has already been read to the host computer, it would be preferable to begin caching with the remainder of the track, rather than wait for the index mark 73 to once again be juxtaposed to the read/write head 27. Accordingly, when it is desired to stage a track to cache, a frame of the appropriate size is selected from the list of available frames of that size and beginning and ending addresses in the cache memory array 34 are then calculated by the cache manager 32 in accordance with the invention of copending application Ser. No. 440,334 filed Nov. 9, 1982 (now abandoned) of Swiatek et al, entitled "Dynamic Addressing For Variable Track Length Cache Memory", incorporated herein by reference. Data is then read from the disk to the cache beginning at a starting address. In order that correspondence can be maintained between the data read from the disk (which, as noted, does not begin with the index mark) the current sector address must be stored. The current sector number can be read from the dedicated disk surface 26A using the information coded thereon, as well understood in the prior art. According to the present invention, the sector number is converted to an emulated track position (ETP) within the cache director 12, at 50, and this is stored as the target ETP in a target ETP register 51. This initial ETP is a measure of the number of bytes from the index mark at which staging of data from the disk to the cache 34 was begun. A current ETP register 514 is initialized to zero and is used in building a table of ETP values at 60, each entry representing the relative ETP for a record. The record number within the first count field found is stored in a target record number register 52, also comprised within the cache director 12. Thereafter, reading of the records on the track between the starting position and the index mark proceeds, whereby the data is read into the cache array complete with the count fields. As each record is staged from DASD to cache, the current ETP value is incremented and an entry is made into the ETP table at 60, giving the beginning address for that record. When the index mark 73 is reached, a current ETP register 54 is set to a value equal to the number of bytes between the index mark and the home address field. The remainder of the records between the index mark and the point at which caching of the data began are then read from the disk to the cache array 34. As each subsequent record is read, the current ETP value in register 54 is incremented to reflect the number of bytes which have passed. Whenever the contents of current ETP register 54 are thus updated by the passage of another record, its value is compared at 53 with that stored in the target ETP register 51 to determine whether the first record staged is once again approaching the read/write head of the disk. When the current ETP is greater than or equal to the target ETP, data has been read from each sector of an entire track of data. When this occurs, the record number (abbreviated REC NO on the drawing) from the current record as comprised in a current record number register 55, to which the record numbers are copied as they pass by the head, is compared at 57 with the record number in the target record number register 52, written to previously as discussed above. When the target record number 52 equals the record number of the current record stored in current record number register 55, it may be concluded that all records in the sector in which staging was started have been read, and accordingly an indication may be provided as at 5B that a full track has been copied to the cache. The entries in the ETP table 60 for records staged prior to encountering the index mark are now adjusted from the relative values originally stored in the ETP table 60 to their actual values. This is required because the exact ETP value for the first record staged is only known after having read all records between index and this first record. The ETP table 60 may then be copied from the director 12, where it is generated, to the cache array 34, where it is stored together with the data, as discussed futher below.

In order to use the "wraparound" method of writing data from disk into cache, whereby the operation can begin wherever convenient, rather than waiting for the index mark to be juxtaposed to the read/write head, the header information written at the beginning of each frame in the cache must comprise means to indicate the relative locations of the records within the frame, so that, for example, when the host later calls for "record 3", there is a directory of cache addresses showing where this record is stored in the cache frame. For example, suppose that there are six records on a given track on a disk drive. The host calls for the first record. It is read directly from the disk to the host. Examination of the channel program by the buffer manager in accordance with the copending applications of Dodd et al referred to above reveals that the subsequent records are likely to be called for as well. This determination consumes some rotational time, so that records 3 through 6, beginning with record 3, are read into the cache beginning at a stated beginning address (BOT). When the index mark is reached, the cache director 12 initializes the present emulated track position (ETP) register 54 and proceeds to read the remainder of the track into the cache, ending with record 2. The host will thereafter presumably call for records 2, 3, 4, 5 and 6, though not necessarily at once. In this connection note that the cache memory subsystem's design is again governed by the requirement of software-transparency. Here this means that the memory subsystem cannot be designed to respond to a request for the "next" record, it must be capable of responding as if to unrelated commands. Accordingly, later the host may call for, e.g., record 5. The cache director then consults its directory, locates the frame and examines the header, so as to be able to index a cache memory address pointer directly to the beginning of record 5, i.e., without reading through records 2 through 4, which is important if the cache is to operate efficiently.

Figure 5:
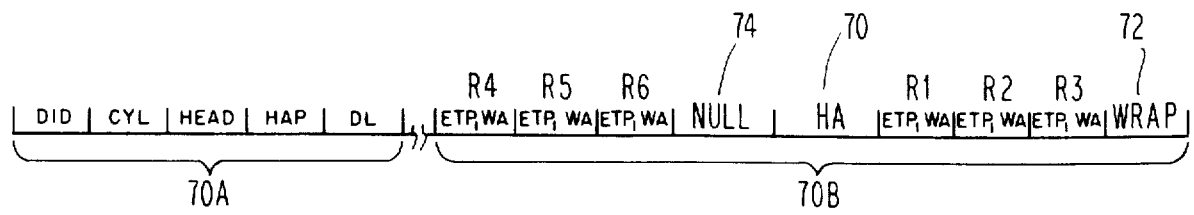
FIG. 5 shows a sample header format.

FIG. 5 shows how the header which appears at the beginning of each frame can be organized to provide this wrap around capability. Stated slightly differently, because of the nature of the stage procedure, the records are not written into the cache frame assigned starting with a home address (HA) field. Instead, the stage operation begins with the first available count field in order to minimize the time spent staging. Since the frame header is built as the records are being staged, the header entries will also start with the first available count field instead of the HA entry. To enable searching the header from the logical beginning to the logical end (as opposed to physical beginning to end), the following aids are introduced. Referring now to FIG. 5, there is an HA (home address) pointer 70 saved in a known location in the frame header. This one byte pointer tells which entry in the header is the home address (HA) 70. This is used by the microcode to locate the logical beginning of the track in the cache. This HA pointer is written to the frame when the header is written. A wrap or end of frame entry is shown at 72. The wrap entry has a unique value in order to insure that it is not mistaken for an ordinary record entry. This entry informs the microcode to wrap to the beginning of the header to find the remainder of the record entries, i.e., this entry locates the end of the last record in the frame. A null entry is indicated at 74. This is a four byte entry embedded in the header that has the hexadecimal value "00000000." This entry, like the wrap entry, is guaranteed to be unique. The purpose of this entry simply is to signal that the end of the track has been reached. Thus, the header of FIG. 5, wherein records R4, R5 and R6 appear before the null entry 74 and home address 70, and records 1, 2 and 3 are placed between the home address 70 and the wrap entry 72, indicates that staging of this particular frame began with the fourth record on the track. Record 6 was the last record on the track, after which the null entry was written. Staging continued after staging of the home address pointer, and concluded with records 1, 2 and 3 after which the wrap entry, indicating the last record written to the physical cache frame was written.

Each of the entries for the records R1-R6 as shown comprises an ETP address, indicating the records starting location on the disk measured in bytes from the index mark and a word address "WA" indicating the starting location of the record within the cache memory. Correspondence is thus fully maintained between the locations of each individual record on the disk and in the cache memory. These entries, together with the null, home address, and wrap entries comprise a header data field 70B. Also comprised in the header stored at the beginning of each frame in the cache is a header control field 70A. This comprises three entries, DID, (device identification), CYL (cylinder number of the staged track), HEAD (head number of the staged DASD track). These three entries clearly identify the location on the disk of the entire track stored in the frame. Also stored as part of the header control field 70A is the HAP, which is a pointer to the home address entry in the header data field 70B (the "known location" referred to above) so that if it is desired to locate the home address within the cache it is not necessary to search through all the records stored previously thereto in the frame. Finally, comprised in the header control field 70A is a DL entry which indicates the length of the header data field. As noted above, one of the objects of the invention is to provide a variable length header for a data field stored in a solid-state array. The DL entry is necessary to indicate the ending of the header data field 70A.

As discussed above, after the entire record has been read from the disk drive into the cache, it is necessary to adjust the ETP values for that portion of the record stored after initiation of the read operation and before detection of the index mark, because the ETP values are not precisely known until the latter time. This may be done in a preferred embodiment of the invention by building the header in the control store conventionally comprised in the director 12. After the track has been entirely read into the cache, the header, complete and adjusted to reflect the exact ETP values for the records first stored, may be copied to the frame (in the cache memory 34) thus freeing the control store for future processing. This approach also provides the advantage that higher speed operations are possible than if the header entries were simultaneously being written to the cache.

It will be appreciated by those skilled in the art that this header format has a distinct advantage that only as many header entries need to be processed as actual records exist on disk in contradistinction to the method of, e.g., providing a header entry for each sector.

FIG. 6 shows schematically the image of the track, including the header, in the cache. The image begins with the frame header 60 (comprising the header control field 70A and the header data field 70B, of FIG. 5) which contains emulated track position values in bytes for beginning locations of the home address field and for record 0, for record 1, for record 2 and so on. The information staged from the DASD track follows the header.

Figure 4B:
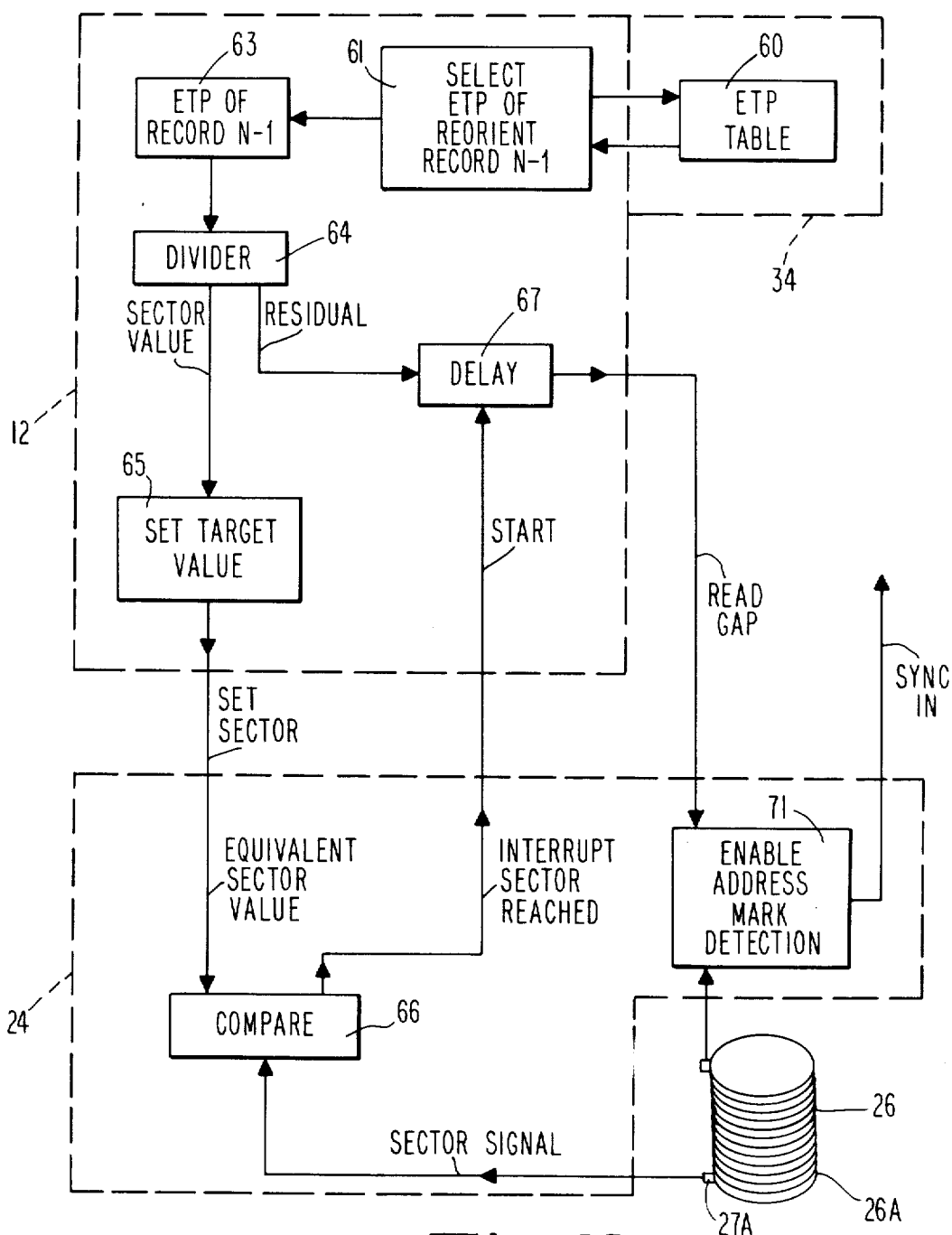

When the host later desires to read a record stored in cache from disk, due to an error or the like, the emulated track position values stored in header data field 70B are used in re-establishing orientation. FIG. 4B shows registers which may be used to establish the orientation and illustrates the interplay between the control module 24 and the director 12 in this operation, while FIGS. 7A, 7B and 7C comprise a detailed illustration of the track format and of certain timing diagrams which further explain how the reorientation operation works.

The discussion above in connection with FIG. 4A illustrated how the disk surface is divided into radially extending sectors 77 and circumferentially extending tracks 72. FIG. 7A shows a more detailed view of one of the tracks. The track is deemed to begin with an index mark 73 (found on the servo disk 26A) followed by a home address mark, a gap, followed by a field indicating the length of record 0, "R0 Count", another gap, "R0 Data", another gap, "R1 Count", another gap and so on. FIG. 7B shows a correspondingly scaled diagram of the sectors into which the track is divided. As will be noted, the sectors do not correspond with the beginnings of the records, nor are there an integral number of records per sector.

As discussed above in connection with FIG. 4A, the typical disk pack with which the invention is designed to be used comprises a number of disk surfaces for the storage of data and a dedicated disk surface 26A which contains permanently encoded sector information. The dedicated disk surface 26A can be used to provide an indication of a sector 77 in the vicinity of a record to be read, but cannot be relied upon to give an absolute indication of the place of beginning of a particular record. In prior art operations when an error was found in trying to locate the count field of a particular data record, it was essential to slip an entire revolution in an attempt to reorient on that same count field once again. If the same error occurred over and over again there was no way to obtain the data stored in the record, i.e., a permanent error was recorded. Recordation of the emulated track positions according to the method of the invention provides a way out of this difficulty. One can attempt to orient on the count field of the preceding record on the disk by using its ETP value stored in the header field, instead of looking for the count field of the record sought for. If an orientation can be established on the prior count field, then the succeeding count field will automatically be that of the record which is sought for. Accordingly, one source of permanent errors in disk drives is avoided by the generation of the ETP table according to the invention. It will be appreciated by those skilled in the art that if one desires to reorient operations from a cache to a disk, one must first locate the count field of the record which is, for example, being called for by a host, and that it is typically impossible to reorient on a particular count field in time to immediately supply the record to the host. Accordingly, if one simply output the emulated track position of the record which is to be located, one would have to wait an entire disk revolution before one could begin sending the data from the disk to the channel. Having generated a full table of ETP values, according to the invention, one can instead reorient on the count field of the record preceding that of interest and can therefore begin reading data substantially immediately upon establishing orientation, thus speeding such reorient operations. Accordingly, when it is desired to reorient a read operation from the cache to the disk, the emulated track position of the record preceding the record of interest is used to locate its count field; thereafter the count field of the record sought is detected. This is explained in connection with FIGS. 7A through 7C. Assuming that record 2 is to be located, the emulated track position of record 2 first retrieved from the header field 70B comprised in frame header field 60 (FIG. 5). The location is shown on the diagram as ETP 2, and, as noted, occurs in sector 2. The sector is determined by dividing the ETP of R2 by the number of bytes per sector, and subtracting 1 from the result. Accordingly, the director looks for the beginning of sector 2 and is enabled at the beginning of sector 2, noted as "Director Waits" at 75 so that when the count field of record 2 is thereafter detected, the director is enabled to transfer the data from the disk to the host computer beginning at the data field of Record 2. Accordingly, the "director waits" time begins at the start of sector 2. A timing window 69 is calculated using $ETP_{R2}$, that is, at the point measured in bytes after the index mark, where it is anticipated that Record 2 will begin. Reading is begun, i.e., the "READ" command is issued to the drive, at the end of the director waiting period. At this time, the drive searches for the next count field. When coincidence is detected, reading of the data can begin.

The timing window is shown centered about the $ETP_{R2}$ position in FIG. 7A. Since the beginning of the timing window must precede the desired count field, the timing window is located by calculating the number of whole sectors in the emulated track position and adding additional bytes to locate the center of the count field detection window. In other words, the number of bytes per sector is divided into the emulated track position, so that the remainder, or residual value, is the number of bytes from the beginning of the next succeeding sector, sector 3 in FIG. 7A, about which the timing window is to be centered. After this calculation is performed, a number of bytes equal to half the width of the timing window is subtracted from the value thus derived and it is at this point, determined by the byte count, that the timing window opens, enabling the director to look for the beginning of the R2 Count field. Accordingly, the total number of ETP bytes, i.e., the number of bytes at which the record sought begins, measured from the index mark, is divided by the number of bytes per sector. For example, if the ETP is 325 bytes from the index mark and if a sector is 100 bytes long, then the ETP of the record sought for is 25 bytes past the beginning of the fourth sector (sector 3, counting from sector 0). If the timing window desired is 40 bytes wide, then it should extend from 5 to 45 bytes after the start of sector 3. The dedicated disk 26A is used to locate the beginning of sector 3; when 5 more bytes have passed, the timing window is "opened".

Hardware to implement the operation of the director during a reorientation operation as just described is depicted in FIG. 4B. Assume that it is desired to reorient on the R2 count field. As indicated at 61, the director selects from ETP table 60 the ETP of the previous record, record R1. (This is designated ETP of record N−1 in FIG. 4B.) The desired reorient count field is the one just prior to the field that requires processing by the channel, in this instance the R1 count field. Orienting on the prior count field enables processing by the channel to immediately resume without slipping a full track operation. The value of $ETP_{R1}$ is set into the register 63. It is converted into an equivalent sector value and a residual value by dividing it by the number of bytes per sector in the disk. This conversion is performed by the divider 64. Assume as an example that the $ETP_{R1}$ is 474. That is, 474 bytes are in the gaps, the home address, the R0 count, and the R0 data fields prior to the R1 count field in FIG. 7A. Dividing 474 by 156 (the number of bytes in a sector) gives a quotient of 3 and a remainder (residual value) of 6. The quotient 3 identifies the target sector value as sector 2. (Since the numbering of sectors begins with 0, the third sector is sector 2.)

As indicated at 65, the director 12 sets the target sector value to 2, which is the equivalent sector value. The control module 24 of the disk drive compares this equivalent sector value with the sector signal provided from the dedicated surface 26A, as indicated at 66. As in response to a conventional SET SECTOR command, when the heads 27 of the disk pack reach sector 2, the control module produces an INTERRUPT SECTOR REACHED signal as shown in FIG. 7C. In response to the INTERRUPT SECTOR REACHED signal, the director 12 enables the reading of records from the disk after a further delay which is indicated at 67. This delay is calculated from the sector residual value. At the termination of this delay, indicated at the point 68 in FIG. 7A, the director 12 begins reading of records stored on disk to the central processing unit. This is accomplished by detecting the first count field which occurs within a timing window indicated at 69 in FIG. 7A. The timing window is established by enabling the address mark detection circuitry 71 in the drive for a duration of 20 track bytes. Since a count field can only occur every 186 track bytes, if a count field is encountered in this 20 track byte window, detection of the desired R2 count field is assured. A window is necessary for this read operation to ensure that the disk drive reliably detects the count field. When detection occurs, the SYNC I signal is given.

In this manner, a program which processes data records may be reoriented from cache memory to the disk drive. This has been accomplished by the use of the table of ETP values. It should be noted that one advantage of the table of ETP values is that it allows reorientation even though all of the bytes in the gaps have not been stored in the cache memory. By using the ETP values according to the present invention, reorientation is possible even though there is not a strict correspondence between records on a disk track and the data copied to the cache memory It will be appreciated by those skilled in the art that the functions of the control module 24 are the same as performed in systems without caching capability, so that the control module need not be modified to perform caching according to this invention and those described in the copending applications incorporated by reference above. Indeed the lack of modification to the control module 24 is a desired object of these inventions.

It will be appreciated that the reorientation of data flow from cache to disk is shown in FIGS. 4B and 7. It is essentially the inverse of the process of copying a track to cache as shown in FIG. 4A. In both cases, a sector address is first looked for, and after the proper sector is located, then the header address is compared with a target header stored in a register so as to determine when the correct header has been reached. This is done in the case of reorientation to allow reading or writing data from the disk to commence at the correct point, and in the case of copying data from the disk to the cache (FIG. 4A) to give the indication that a full track has been thus copied. The reorientation process described in connection with FIGS. 4B and 7 is slightly complicated by the fact that the sector preceding that containing the record at which reading from the disk is desired to begin must be looked for because the record's starting location or disk cannot be assumed to be coincident with the beginning of the sector within which they are located.

In the event of an error indication generated by the cache manager, it is important that "orientation" or data path establishment be redirected from the cache to the disk device so that the cache can be "cut out" of the data path, thus returning the path to that which would have existed if the cache had never been added to the long-term memory storage system. This must be done as discussed above in such a way that the addition of the cache requires no modifications to the host, i.e., that it be plug compatible and software transparent thereto. Accordingly, when the system of the invention detects an error in the cache system it is inappropriate to terminate the host's request with the indication that the operation cannot be completed. In fact, the operation can be completed on the disk device to which the host's request was ostensibly addressed, thus fulfilling the goal of software transparency mentioned above. The problem with switching the operation to the disk drive is one of insuring that the operation begins at the correct starting address on disk. Superficially, it would appear that it would be sufficient to compare the record identifier of the disk record supplied by the host against the identifier from the operation in the cache. However, there is no guarantee that all the record identifiers on the track are unique. A data integrity problem could thus be presented. This is overcome according to the present invention by using both the record identifier, which is an integral part of each record, and the ETP value associated with the starting point of the record on a track. Both variables are available at the time the cache is being used to satisfy the host's request.

As an example, attached hereto as Appendix A and incorporated by reference is a microcode-language document entitled "STAGE REORIENT" which details the way in which reorientation as described above is accomplished. This document, together with the above description of the invention and the copending applications referred to and incorporated by reference above, will enable those skilled in the art to practice it without difficulty.

It will be appreciated that there has been described a method of control of a cache buffer memory which satisfies the needs of the art and objects of the invention listed above. By generating emulated track position information as to each record as data is read from disk into cache, one has available at all times an accurate correlation between disk and present cache address if for some reason it is desired to switch channel orientation back to the disk from the cache. Furthermore, correct maintenance of the ETP register allows one to know accurately when the entire disk track has been read. This in turn permits one to write data from disk to cache without waiting for the index mark to be juxtaposed to the read/write head. Finally, provision of a frame header generated when the data is written to the cache permits the header to be of a length proportional to the number of records in the cache, while providing a direct correspondence between the location of records in the cache and their locations on disk.

Those skilled in the art will likewise recognize that there are numerous improvements and modifications that can be made to the invention without departure from its essential spirit and scope which is therefore not to be limited by the above exemplary disclosure of the preferred embodiment, but only by the following claims.

APPENDIX A

```
LC  90039              ** MICROCODE ASSEMBLER 6.8  08/25/82  18:21:14 **        PN 5007038-01
                                       PROGRAM:  JX100

Stage Reorient

ADDR   INST                         STATEMENT                                     STMT #

****************** START OF SPECIFICATIONS ******************   *  002000      2
                                                                       *  003000      3
       *  MODULE NAME:  JX100                                          *  004000      4
       *                                                               *  005000      5
       *  MODULE TITLE:  Stage Reorient                                *  006000      6
       *                                                               *  007000      7
       *  FUNCTIONAL DESCRIPTION                                       *  008000      8
       *  ---------- -----------                                       *  009000      9
       *  This module regains orientation on the DASD track.  The registers  *  010000  10
       *  in the Stage Orientation Group (SOG)   and the Stage Control Group *  011000  11
       *  (SCG) are initialized by this module.                        *  012000     12
       *                                                               *  013000     13
       *  No parameters are explicitly passed to or returned from this *  014000     14
       *  module.                                                      *  015000     15
       *                                                               *  016000     16
       *  OPERATIONAL DESCRIPTION                                      *  017000     17
       *  ----------- -----------                                      *  018000     18
       *  The current ETP is initialized to zero, and the Header Entry *  019000     19
       *  Pointer is set to point to the beginning of the first entry in the *  020000  20
       *  frame header buffer area.                                    *  021000     21
```

```
*   The current sector value is read from the DASD and converted into      *  022000   22
*   the Target ETP value and saved in the Stage Orientation Group          *  023000   23
*   (SOG). To find the next count field, a Read G3 AM Search is            *  024000   24
*   executed on DASD via the following steps:                              *  025000   25
*                                                                          *  026000   26
*                                                                          *  027000   27
*     1) The Set Read/Write Mode module is called.                         *  028000   28
*     2) Issue a Read G3 AM Search tag.                                    *  029000   29
*     3) Call the Wait for DASD Tag Valid module.                          *  030000   30
*     4) Set up the DASD transfer controls.                                o  031000   31
*     5) Wait for DASD end of transfer.                                    *  032000   32
*     6) Compare the physical address bytes from the Group C registers     o  033000   33
*        with the physical address bytes in the Data Buffer count          o  034000   34
*        field area. If they are not the same, take an error exit.         *  035000   35
*     7) Save the 'record number' byte from the count field as the         o  036000   36
*        Target Record Number in the Stage Control Group (SCG).            *  037000   37
*        Initialize the defect bits in the Orientation Control Byte        *  038000   38
*        (SCG) using bits from the count field flag byte. Save the         *  039000   39
*        'SD1' bytes from the count field as the Current Skip Defect       *  040000   40
*        bytes (SOG). The Current Field Length bytes (SOG) are             *  041000   41
*        initialized to zero.                                              *  042000   42
*     8) Call the Wait for DASD Normal End module.                         *  043000   43
*                                                                          *  044000   44
*   If no count field is encountered by the time index comes up in the     *  045000   45
*   DASD, then the 'reorient point at index' bit is set and the Target     *  046000   46
*   ETP is set to the maximum value.                                       *  047000   47
*                                                                          *  048000   48
*   SPECIAL CONSIDERATIONS                                                 *  049000   49
*   ------ --------------                                                  *  050000   50
*   None.                                                                  *  051000   51
*                                                                          o  052000   52
*   INTERNAL ITEMS     NAME          DESCRIPTION/PARAMETERS                *  053000   53
*   -------- -----     ----          ----------------------                *  054000   54
*   ENTRY POINT(S):    JX100                                               o  055000   55
*   NORMAL EXIT(S):    caller                                              o  056000   56
*   ERROR EXIT(S):     JX995         Stage Error Exit                      o  057000   57
o                                      Time-out waiting for Address Mark   o  058000   58
o                                      Error while waiting for EOT         o  059000   59
*                                      Physical address miscompare on stage *  060000   60
o                                      DASD index reset time-out           o  061000   61
*   ROUTINES USED:     JX900         Wait for DASD Tag Valid               o  062000   62
*                      JX945         Wait for DASD Normal End              *  063000   63
*                      JX955         Get Current DASD Sector               *  064000   64
*                      JX985         Set Read/Write Mode                   *  065000   65
*                      KX130         Multiply                              *  066000   66
*   MACROS USED:       XSETSIRG      Set Secondary IRG                     *  067000   67
*   DATA STRUCTURES:   ZX420   R/W   Stage Control Group (SCG)             *  068000   68
*                      ZX430   R/W   Stage Orientation Group (SOG)         *  069000   69
*                      DB Count R/W  Data Buffer count field (DBC)         *  070000   70
*                      Group C  R    Group C registers                     *  071000   71
*   INTERNAL REGS:     current group not affected                          o  072000   72
*   EXTERNAL REGS:     IRG     W     Internal Register Group               o  073000   73
*                      DTG     W     Device Tag Gate                       *  074000   74
*                      DTO     W     Device Tag Out                        *  075000   75
*                      DBO     W     Device Bus-out                        *  076000   76
*                      DCH     W     Device Transfer Counter High          *  077000   77
*                      DCL     W     Device Transfer Counter Low           *  078000   78
*                      DXC     W     Device Transfer Control               *  079000   79
*                      BIP     W     Buffer Input Pointer                  o  080000   80
*                      BOP     W     Buffer Output Pointer                 *  081000   81
*                      MCS     W     Maintenance Control/Sense             o  082000   82
*                      XCS     R     Transfer Complete Status              o  083000   83
*                      DTI     R     Device Tag In                         o  084000   84
*                      BAP     W     Buffer Address Pointer                *  085000   85
*                      BFI     R     Buffer Increment Register             *  086000   86
*                                                                          *  087000   87
*   ENTRY IRG:  Pri - <7       EXIT IRG:  Pri - restored                   *  088000   88
*               Sec - SCG                 Sec - SCG                        *  089000   89
*                                                                          *  090000   90
*   CHANGE ACTIVITY                                                        *  091000   91
*   ------ --------                                                        *  092000   92
*   02/10/82  BET   Added error exit parameters                            *  093000   93
*   03/17/82  BET   Added chained stage enhancement                        *  094000   94
*   06/09/82  BET   Implemented fix for reorient on record 1               *  095000   95
*   07/06/82  BET   Lengthened AM time-out timer                           *  096000   96
*                                                                          *  097000   97
******************** END OF SPECIFICATIONS ********************            098000   98

ORG  JX100                                                      100000  100
*--------------------------------------------------------------------*     101000  101
* ENTRY Stage Reorient                                               *     102000  102
*                                                                    *     103000  103
* Set Current-ETP (SOG) to zero                                      *     104000  104
* Set Entry-Pointer (SCG) to point to the first entry in the Frame   *     105000  105
*     Header Buffer                                                  *     106000  106
*--------------------------------------------------------------------*     107000  107
           JX100  IRG = IRG + X10      *Point to next primary group        108000  108
                  XSETSIRG STGOG       *Point secondary IRG at SOG         109000  109
3421 31F0  +      IRG = IRG . XF0      *Set the secondary IRG to the       035000
3422 33F0  +      IRG = IRG / X0D      *  desired value                    036000
3423 8AC0         S4 = X00             *Set current ETP bytes to zero      110000  110
3424 8AD0         S5 = X00                                                 111000  111
                  XSETSIRG STGCG       *Point secondary IRG at SCG         112000  112
3425 31F0  +      IRG = IRG . XF0      *Set the secondary IRG to the       035000
3426 33F9  +      IRG = IRG / X09      *  desired value                    036000
3427 9AC4         S4 = $FHBDF1         *Set current FHB entry pointer to   113000  113
3428 9AD5         S5 = :FHBDF1         *  point to the first entry in FHB  114000  114
```

(3420 27F1 at left of JX100 line)

```
*----------------------------------------------------------------*
*   CALL Get Current DASD Sector module                          *
*     PASS:    nothing                                           *
*     RECEIVE: Sector-Value (local)                              *
*   CALL Multiply module                                         *
*     PASS:    multiplier value (156), Sector-Value              *
*     RECEIVE: Target-ETP (local - copied to SCG)                *
*   Add the overflow shift constant (xB200) to Target-ETP        *
*----------------------------------------------------------------*
3429  20CB              DTG = DTG . X8F        *Reset tag gate (just in case)
342A  69C8              BAL     JX955          *Go get the current sector value
342B  CB1C              P1 = X9C               *Set up mulitplier parm for KX130
342C  6F88              BAL     KX130          *Go multiply sector times bytes/sctr
342D  4E3A              S253 = P2P3            *Copy product parm to Target ETP bytes
342E  86B0              S3 = S3 + :X86500SC    *Add the overflow shift constant into
342F  DFA2              S2 = S2 + $X86500SC + C *  the Target-ETP bytes
*----------------------------------------------------------------*
*   CALL Set Read/Write Mode module                              *
*     PASS:    nothing                                           *
*     RECEIVE: nothing                                           *
*   IF Target-ETP indicates end of track                         *
*     THEN Set Target-ETP for beginning of track                 *
*   Toggle 'Index latch reset' bit (DTG register)                *
*   Load a Read G3 AM Search tag on the CTL-I                    *
*   CALL the Wait for DASD Tag Valid module                      *
*     PASS:    nothing                                           *
*     RECEIVE: DASD bus-in value                                 *
*----------------------------------------------------------------*
3430  67DB              BAL     JX985          *Go set R/W mode
3431  FDAF              D = S2 CE XFF          *Check Target-ETP high for EOT
3432  4B35              BNEQ    NOTEOT         *Branch if not EOT
3433  DBA2              S2 = $X86500SC         *Set Target-ETP for beginning of track
3434  8AB0              S3 = :X86500SC
3435  3AEE     NOTEOT   DTG = X0E              *Set tag bus for a read tag
3436  2A97              DBO = X70              *Set bus-out for a Read G3 AM Search
3437  3292              DBO = DBO / X02
3438  22C1              DTG = DTG / X10        *Toggle 'reset index latch' bit
3439  20CE              DTG = DTG . XEF
343A  67B5              BAL     JX900          *Go execute the tag sequence
*----------------------------------------------------------------*
*   Set the DASD data transfer counters (DCH, DCL registers)     *
*   Set the Buffer Input and Buffer Output pointers (BIP & BOP registers)*
*   Set the input priority mode (DXC register) on for the Data Buffer *
*   Set the DASD read/write/clock control bits (DTG register) for a read *
*   Set the remaining CTL-I transfer control bits (DTG, MCS, DXC regs) *
*----------------------------------------------------------------*
343B  3AA0              DCH = X00              *Set DASD transfer counters
343C  2AB1              DCL = X10
343D  32B2              DCL = DCL / X02
343E  30J8              DXC = DXC . XFB        *Reset BIP/BOP high order bit
343F  FA0E              PO = XEE               *Set the BIP and BOP registers to
3440  2E00              BIP = PO               *  point to the beginning of the
3441  2E10              BOP = PO               *  count field
3442  3232              DXC = DXC / X02        *Set Input priority mode
3443  30C0              DTG = DTG . XF0        *Set inhibit first decrement and
3444  32CA              DTG = DTG / X0A        *  read mode
3445  32C1              DTG = DTG / X01        *Set run device
3446  21AC              MCS = MCS . XCF        *Why am I
3447  23A3              MCS = MCS / X30        *  doing this?
3448  3231              DXC = DXC / X01        *Set run auto
*----------------------------------------------------------------*
*   Set EOT-Timer (local) for 20 milliseconds                    *
*   DO-WHILE waiting for DASD end of transfer (XCS register)     *
*     Decrement EOT-Timer                                        *
*     IF EOT-Timer is zero                                       *
*        THEN TRANSFER to Stage Error Exit                       *
*                PARM LIST: Time-out waiting for Address Mark    *
*        ELSE NULL                                               *
*----------------------------------------------------------------*
3449  9A03              PO = X23               *Set EOT timer for 20 milliseconds
344A  CA13              P1 = X83               * (that's 9,091 loops, folks!)
344B  2002     CHK_EOT  D = XCS TM X20         *Test DASD EOT bit
344C  4373              BNZ     EOT_UP         *Branch if EOT is up
344D  F71F              P1 = P1 + XFF          *Decrement the timer
344E  FF0F              PO = PO + XFF + C
344F  4554              BCY     CHK_INDX       *Branch if timer is not expired
3450  6AD0              BAL     JX995          *Branch to error exit routine
3451  8E41              DC X8E41               * Time-out waiting for AM
3452  3B01              DA NX005
3453  9241              DC X9241
*----------------------------------------------------------------*
*   IF Index (DTI register) is encountered                       *
*      THEN-DO for Index encountered                             *
*         Set 'reorient point at index' flag (SCG)               *
*         Set Target-ETP to the out of range value (xFFFF)       *
*         Set Index-Timer (local) for 15 microseconds            *
*----------------------------------------------------------------*
3454  3B02     CHK_INDX D = DTI TM X02         *Test Index latch
3455  41GA              BZ      CHK_CEC2       *Branch if it is down
3456  8201              SO = SO / X01          *Set 'reorient point at index' flag
3457  FBAF              S2 = XFF               *Set Target ETP out of range
3458  FBBF              S3 = XFF
3459  BA2A              P2 = X0A               *Set Index reset loop timer
```

```
                .------------------------------------------------------.  208000  208
                .   DO-WHILE Index latch is up                         .  209000  209
                .       Decrement Index-Timer                          .  210000  210
                .       If Index-Timer equals zero                     .  211000  211
                .           THEN TRANSFER to Stage Error Exit          .  212000  212
                .               PARM LIST: DASD index reset time-out   .  213000  213
                .           ELSE Toggle 'index latch reset' bit        .  214000  214
                .   END-WHILE Index latch is up                        .  215000  215
                .   Send response to the DASD                          .  216000  216
                .   Reset run auto (DXC register) and run device (DTG reg) bits . 217000  217
                .                                                      .  218000  218
                .   RETURN for reorient point at index                 .  219000  219
                .                                                      .  220000  220
                .   END-THEN for index encountered                     .  221000  221
                .   ELSE NULL                                          .  222000  222
                .------------------------------------------------------.  223000  223
345A  3802      CIK_DROP  D = DTI TM X02         *Test Index latch       224000  224
345B  4165                BZ        SEND_RSP     *Branch if it is off    225000  225
345C  F72F                P2 = P2 + XFF          *Decrement index reset loop timer 226000 226
345D  43G2                BNZ       RST_INDX     *Branch if timer is not expired 227000 227
345E  6AD0                BAL       JX995        *Branch to error exit routine 228000 228
345F  8E45                DC X8E45                 . DASD index reset time-out 229000 229
                                                                          230000  230
3460  3B01                DA NX005                                        231000  231
3461  9245                DC X9245                                        
3462  22C1      RST_INDX  DTG = DTG / X10        *Toggle 'index latch reset' bit 232000 232
3463  20CE                DTG = DTG . XEF                                 233000  233
3464  045A                B         CIK_DROP     *Go check index latch again 234000 234
3465  22C2      SEND_RSP  DTG = DTG / X20        *Toggle response line to DASD 235000 235
3466  20CD                DTG = DTG . XDF                                 236000  236
3467  30CE                DTG = DTG . XFE        *Reset run device        237000  237
3468  30DE                DXC = DXC . XFE        *Reset run auto          238000  238
3469  04A0                B         EXIT         *Branch to module exit   239000  239
                .------------------------------------------------------.  240000  240
                . IF check-2 (XCS register) is on       or             .  241000  241
                .    check end (DTI register) is on and index is off   .  242000  242
                .    THEN TRANSFER to Stage Error Exit                 .  243000  243
                .        PARM LIST: Error while waiting for EOT        .  244000  244
                .    ELSE NULL                                         o  245000  245
                o END-WHILE waiting for EOT                            o  246000  246
                .------------------------------------------------------.  247000  247
346A  1005      CIK_CEC2  JH XCS 0  EOT_ERR      *Branch to err exit if check-2 is on 248000 248
346B  2802                D = DTI TM X20         *Test check end bit      249000  249
346C  4148                BZ        CIK_EOT      *Branch if check end is off 250000 250
346D  3802                D = DTI TM X02         *Test index bit          251000  251
346E  4348                BNZ       CIK_EOT      *Branch if it is on - no error 252000 252
346F  6AD0      EOT_ERR   BAL       JX995        *Branch to error exit routine 253000 253
3470  8E43                DC X8E43                 . Error while waiting for EOT 254000 254
3471  3B01                DA NX005                                        255000  255
3472  9243                DC X9243                                        256000  256
                                                                          257000  257
                .------------------------------------------------------.  
                . Reset run auto (DXC register) and run device (DTG register) bits . 258000 258
                . IF the physical address bytes from the Data Buffer count field area . 259000 259
                .    don't match the physical address bytes in the Group C registers . 260000 260
                .  . THEN TRANSFER to Stage Error Exit                 .  261000  261
                .        PARM LIST: Physical address miscompare on a stage . 262000 262
                .    ELSE NULL                                         .  263000  263
                .------------------------------------------------------.  264000  264
3473  30CE      EOT_UP    DTG = DTG . XFE        *Reset run device        265000  265
3474  3036                DXC = DXC . XF6        *Reset run auto and BAP high order bit 266000 266
                          XSETSIRG XOC           *Point secondary IRG at SCG 267000  267
3475  31F0    +           IRG = IRG . XF0                                 035000
3476  33FC    +           IRG = IRG / XOC          . desired value        036000
3477  2A2F                BAP = XF0              *Point BAP at physical address bytes 268000 268
3478  3224                BAP = BAP / X04          . in the DB count field area 269000  269
3479  2C53                P3 = BFI               *Get cylinder high       270000  270
347A  7C83                D = P3 CE S0           *Compare it to the value in group C 271000 271
347B  4882                BNEQ      PA_MISC      *Error if they are not equal 272000 272
347C  2C53                P3 = BFI               *Get cylinder low        273000  273
347D  7C93                D = P3 CE S1           *Compare it to the value in group C 274000 274
347E  4882                BNEQ      PA_MISC      *Error if they are not equal 275000 275
347F  2C53                P3 = BFI               *Get head                276000  276
3480  7CA3                D = P3 CE S2           *Compare it to the value in group C 277000 277
3481  4988                BEQ       PA_OK        *Branch if they are equal 278000  278
                PA_MISC   XSETSIRG STGCG         *Point secondary IRG at SCG 279000 279
3482  31F0    + PA_MISC   IRG = IRG . XF0        *Set the secondary IRG to the 035000
3483  33F9    +           IRG = IRG / X09          . desired value        036000
3484  6AD0                BAL       JX995        *Branch to error exit routine 280000 280
3485  8E44                DC X8E44                 . Physical address miscompare 281000 281
3486  3B01                DA NX005                                        282000  282
3487  9244                DC X9244                                        283000  283
                PA_OK     XSETSIRG STGCG         *Point secondary IRG at SCG 284000  284
3488  31F0      PA_OK     IRG = IRG . XF0        *Set the secondary IRG to the 035000
3489  33F9                IRG = IRG / X09          . desired value        036000
                .------------------------------------------------------.  285000  285
                . Set defect bits in the Orientation Control Byte from the flag byte . 286000 286
                .   defect bits in the DB count area                   .  287000  287
                . Set Target-Record-Number (SCG) = record number from DB count area . 288000 288
                . IF key length byte in the Data Buffer count area is nonzero . 289000 289
                .   THEN Set 'key field next' flag (SCG) on            .  290000  290
                .   ELSE Set 'data field next' flag (SCG) on           .  291000  291
                . Set Current-Skip-Defect-Bytes (SOG) = SD1 bytes from DB count area . 292000 292
                . Set Field-Length-Bytes (SOG) to zero                 .  293000  293
                .------------------------------------------------------.  294000  294
348A  2C53                P3 = BFI               *Get flag byte from DB count area 295000 295
348B  F030                P3 = P3 . XE0          *Keep skip defect bits   296000  296
348C  018F                S0 = S0 . X1F          *Reset skip defect bits in OCB 297000 297
348D  7230                S0 = S0 / P3           *Set new skip defect bits in OCB 298000 298
348E  3624                BAP = BAP + X04        *Point BAP at record number byte 299000 299
348F  2C59                S1 = BFI               *Save as Target Record Number 300000 300
3490  2C53                P3 = BFI               *Get key length byte     301000  301
3491  4194                BZ        SET_DFN      *Branch if key length is zero 302000 302
3492  8284                S0 = S0 / X04          *Set 'key field next' flag in OCB 303000 303
3493  0495                B         SET_CSDB     *Go set up Current Skip Defect bytes 304000 304
3494  8282      SET_DFN   S0 = S0 / X02          *Set 'data field next' flag in OCB 305000 305
                SET_CSDB  XSETSIRG STGOG         *Point secondary IRG at SOG 306000  306
3495  31F0    + SET_CSDB  IRG = IRG . XF0        *Set the secondary IRG to the 035000
```

```
3496  33F0          +        IRG = IRG / X00              * desired value                              036000
3497  2A2F          +        BAP = XF0                    *Point BAP at SD1 bytes in DB count          307000    307
3498  3222                   BAP = BAP / X02                                                           308000    308
3499  2C5B                   S0  = BFI                    *Copy SD1 bytes to Current Skip             309000    309
349A  2C59                   S1  = BFI                    * Defect bytes                              310000    310
349B  BAA0                   S2  = X00                    *Zero Field Length bytes                    311000    311
349C  BAB0                   S3  = X00                                                                312000    312
                             XSETSIRG STGCG               *Point secondary IRG at SCG                 313000    313
349D  31F0          +        IRG = IRG . XF0              *Set the secondary IRG to the               035000
349E  33F9          +        IRG = IRG / X09              * desired value                             036000
                   *-------------------------------------------------------------*                    314000    314
                   * CALL Wait for DASD Normal End module                        *                    315000    315
                   *   PASS:  nothing                                            *                    316000    316
                   *   RECEIVE: DASD bus-in value                                *                    317000    317
                   *                                                             *                    318000    318
                   * RETURN for reorient point at a count field                  *                    319000    319
                   *-------------------------------------------------------------*                    320000    320
349F  6871                   BAL         JX945            *Go wait for DASD normal end                321000    321
34A0  27FF           EXIT    IRG = IRG + XF0              *Point to last primary group                322000    322
34A1  4C54                   BALR P4P5,P4P5               *Return to the caller                       323000    323
34A2                         END                                                                      324000    324
```

Stage Reorient

LABEL TABLE WITH REFERENCES

| LABEL | ADDR | EQUATE VALUE | REFERENCE ADDRESSES |
|---|---|---|---|
| BAP |  | E2 | 3477 3478 3478 348E 348E 3497 3498 3498 |
| BFI |  | E5 | 3479 347C 347F 348A 348F 3490 3499 349A |
| BIP |  | E0 | 3440 |
| BOP |  | E1 | 3441 |
| CIIK_CEC2 | 346A |  | 3455 |
| CIIK_DROP | 345A |  | 3464 |
| CIIK_EOT | 344B |  | 346C 346E |
| CIIK_INDX | 3454 |  | 344F |
| DBO |  | E9 | 3436 3437 3437 |
| DCH |  | E10 | 343B |
| DCL |  | E11 | 343C 343D 343D |
| DTG |  | E12 | 3429 3429 3438 3438 3439 3439 3443 3443 3444 3444 3445 3445 3462 3462 3463 3463 3465 3465 3466 3466 3467 3467 3473 3473 |
| DTI |  | E13 | 3454 345A 346B 346D |
| DTO |  | E14 | 3435 |
| DXC |  | E3 | 343E 343E 3442 3442 3448 3448 3468 3468 3474 3474 |
| EOT_ERR | 346F |  | 346A |
| EOT_UP | 3473 |  | 344C |
| EXIT | 34A0 |  | 3469 |
| FHBDF1 |  | X2425 | 3427 3428 |
| IRG |  | E31 | 3420 3420 3421 3421 3422 3422 3425 3425 3426 3426 3475 3475 3476 3476 3482 3482 3483 3483 3488 3488 3489 3489 3495 3495 3496 3496 349D 349D 349E 349E 34A0 34A0 |
| JX100 |  | X3420 | 3420 |
| JX900 |  | X37B5 | 343A |
| JX945 |  | X3871 | 349F |
| JX955 |  | X39C8 | 342A |
| JX985 |  | X37DB | 3430 |
| JX995 |  | X3AD0 | 3450 345E 346F 3484 |
| KX130 |  | X3F88 | 342C |
| MCS |  | E26 | 3446 3446 3447 3447 |
| NOTEOT | 3435 |  | 3432 |
| NX005 |  | X3BD1 | 3452 3460 3471 3486 |
| PA_MISC | 3482 |  | 347B 347E |
| PA_OK | 3488 |  | 3481 |
| P0 |  | P0 | 343F 3440 3441 3449 344E 344E |
| P1 |  | P1 | 342B 344A 344D 344D |
| P2 |  | P2 | 3459 345C 346C |
| P2P3 |  | P2P3 | 342D |
| P3 |  | P3 | 3479 347A 347C 347D 347F 3480 348A 348B 348B 348D 3490 |
| P4P5 |  | P4P5 | 34A1 34A1 |
| RST_INDX | 3462 |  | 345D |
| SEND_RSP | 3465 |  | 345B |
| SET_CSDB | 3495 |  | 3493 |
| SET_OFN | 3494 |  | 3491 |
| STGCG |  | X09 | 3425 3482 3488 349D |
| STGOG |  | X0D | 3421 3495 |
| S0 |  | S0 | 3456 3456 347A 348C 348C 348D 348D 3492 3492 3494 3494 3499 |
| S1 |  | S1 | 347D 348F 349A |
| S2 |  | S2 | 342F 342F 3431 3433 3467 3480 349B |
| S2S3 |  | S2S3 | 342D |
| S3 |  | S3 | 342E 342E 3434 345B 349C |
| S4 |  | S4 | 3423 3427 |
| S5 |  | S5 | 3424 3428 |
| XCS |  | E0 | 344B 346A |
| XBG500SC |  | XB200 | 342E 342F 3433 3434 |

We claim:

1. A cache memory subsystem for use with a magnetic disk data storage media having a plurality of circumferentially extending tracks, each of which have one or more data records including a header with a count field having a record number, wherein the magnetic disk data storage media is adapted to be accessed by a read/write head, said cache memory subsystem comprising:

a solid-state memory array having adaptively-partitioned domains; and controller means, said controller means including means for converting a plurality of sector numbers read from said magnetic disk data storage media into a plurality of emulated track positions each of which is indicative of a point on a given disk track at which a given data record stored in said cache memory subsystem begins, means for storing a target record number corresponding to a record number of the data record in which the count field first read by the head is found, and a first and a second comparison means for maintaining correspondence between data locations on said magnetic disk data storage media and storage addresses of data records stored in said solid-state array by comparison of a preselected one of said emulated track positions so converted to a number indicative of a starting address of said given data record in said cache memory, said preselected one of said emulated track positions so converted representing a target emulated track position, a detection of which is made by said first comparison means, whereupon an indication of said detection is output to said second comparison means which receives said target record number and thereafter detects the correspondence of said given data record to said target record number;

wherein said target emulated track position is stored in a first register at the beginning of writing of data from a disk track into said cache memory subsystem, a second register being first initialized to zero when an index mark is detected on said disk track, thereafter said second register storing a current emulated track position, a value of which is incremented upon reading of each subsequent data record to reflect a number of bytes read from said disk track to said cache, said current emulated track position being compared to said target emulated track position in said first comparison means until said current emulated track position is equivalent to said target emulated track position, whereupon a first signal is sent from said first comparison means to said second comparison means, said second comparison means comparing said target record number to current record number corresponding to the record number of the data record being read, a second signal indicative that an entire track has been read being output from said second comparison means upon the occurrence of said first signal and the equivalency of said target record number and said current record number.

2. In a method of controlling a cache memory subsystem which stores information in the form of data received from magnetic disk memory media in quantities equal to the capacity of one disk track, wherein said data is read sequentially starting at any track position on a given disk track, the improvement which comprises:

converting each of a plurality of sector numbers read from said magnetic disk memory media into respective emulated track positions, each of which is indicative of a point on a given disk track in which a given data record stored in said cache memory subsystem begins;

in a first register, storing a preselected one of said emulated track positions so converted, said preselected one of said emulated track positions corresponding to a target emulated track position;

detecting an index mark on said disk;

setting a second register to zero upon detection of said index mark during reading of said data from said disk into said cache;

incrementiing said second register upon reading of successive bytes of data;

comparing the contents of said second register with said target emulated track position stored in said first register, and when said contents equal said target emulated track position, providing an indication that an entire disk track has been read into said cache;

writing header information from the first record read from disk into said cache in a given operation into a third register, comparing the contents of said third register with header information stored on said disk as part of records written to said cache, and terminating said read operation when correspondence is found and said indication is provided from said first comparing step.

* * * * *

UNITED STATES PATENT AND TRADEMARK OFFICE
CERTIFICATE OF CORRECTION

PATENT NO. : 4,780,808

DATED : October 25, 1988

INVENTOR(S) : Moreno et al.

It is certified that error appears in the above-identified patent and that said Letters Patent is hereby corrected as shown below:

Column 2, line 45, please change "ca" to --can--.

Column 2, line 60, please change the word "comxon" to --common--.

Column 9, line 30, please change the word "unlike" to --unlikely--.

Column 10, line 62, please change the word "syndhronization" to --synchronization--.

Column 14, line 33, please change the word "sbows" to --shows--.

Column 17, line 9, please change "cacheto" to --cache to--.

Signed and Sealed this

Eighth Day of August, 1989

Attest:

DONALD J. QUIGG

Attesting Officer

Commissioner of Patents and Trademarks